1

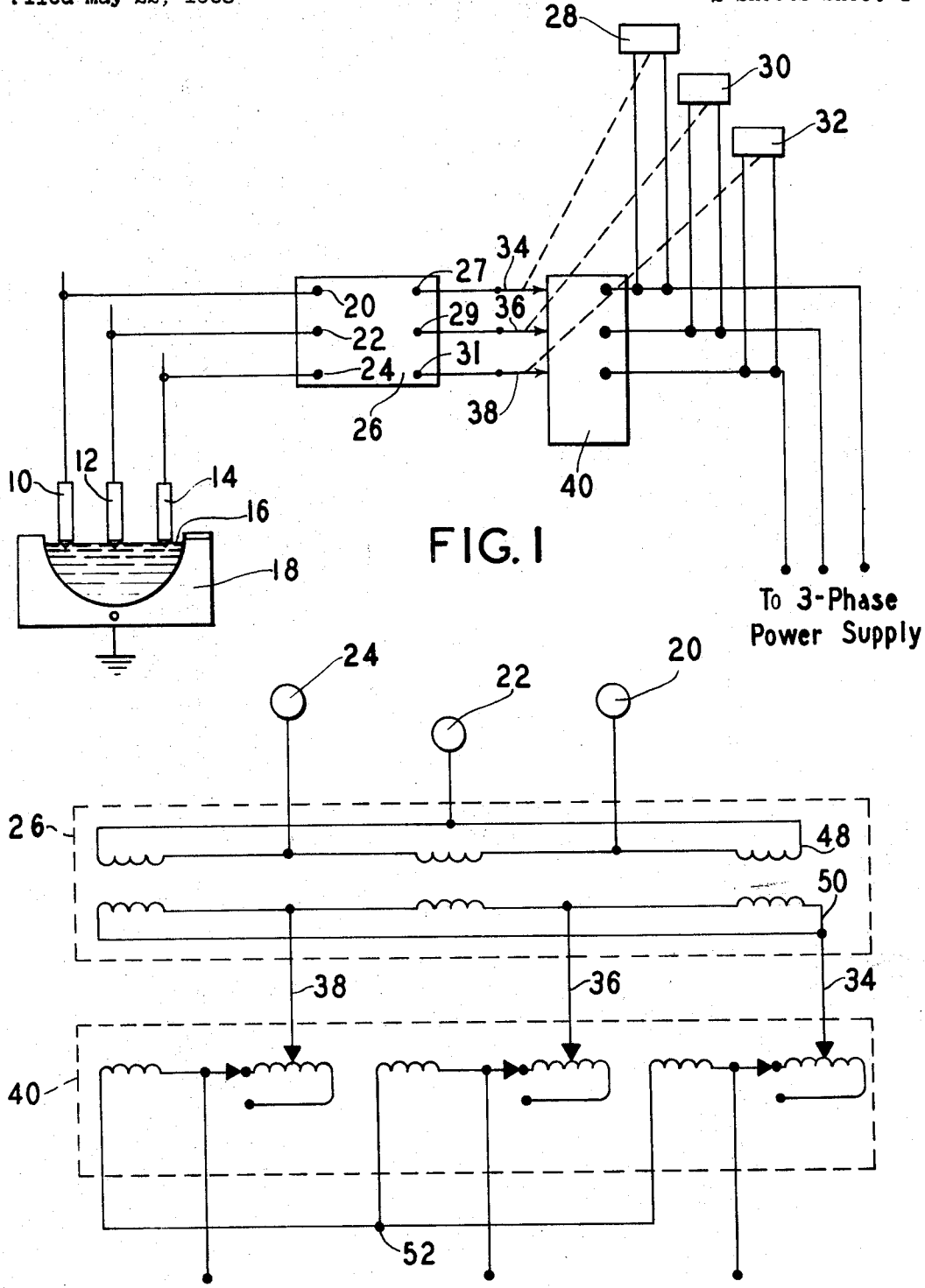

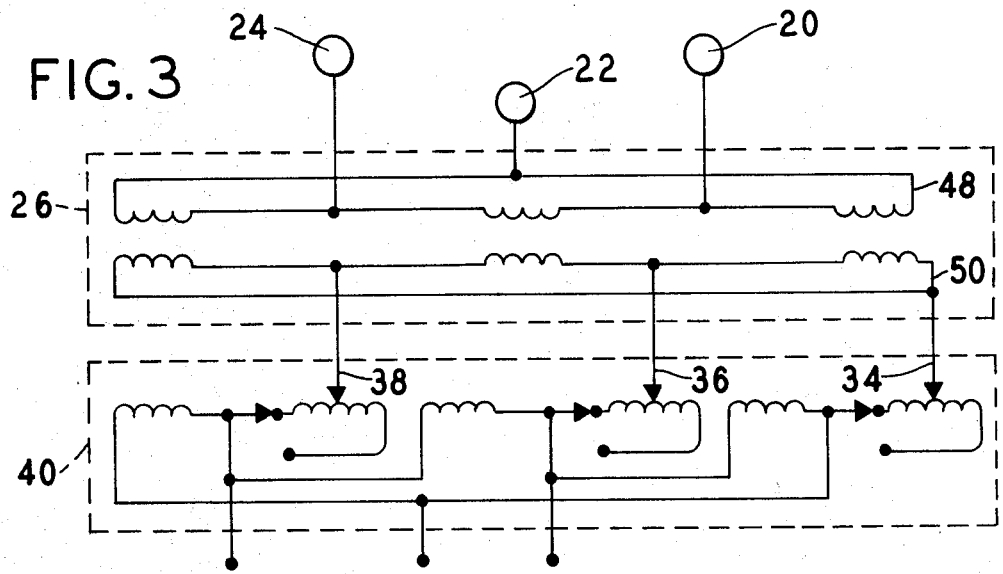
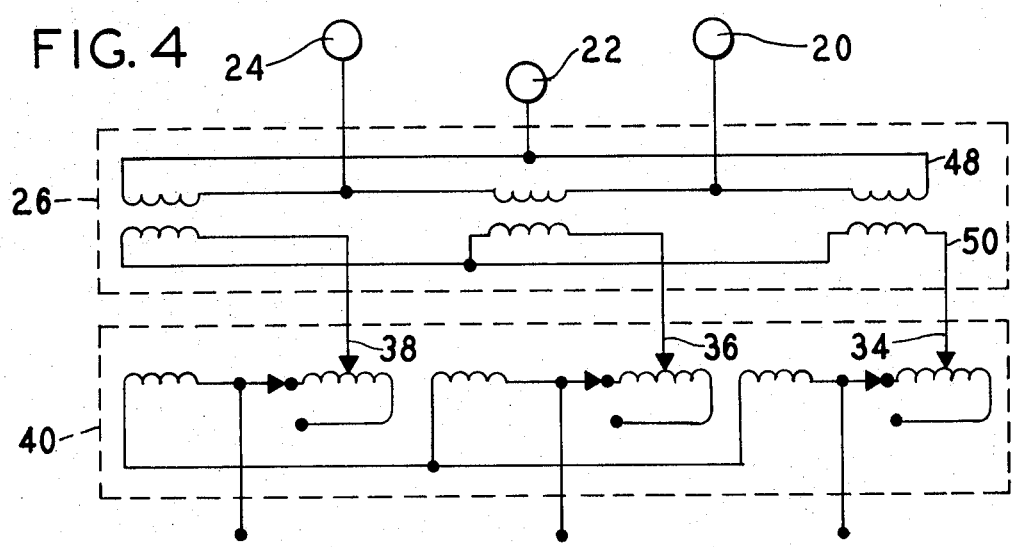
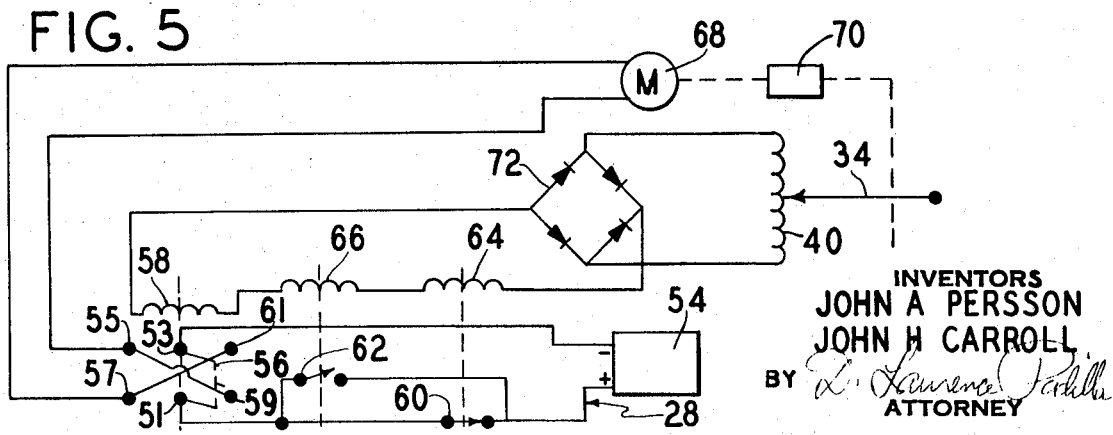
INVENTORS
JOHN A PERSSON
JOHN H CARROLL
BY Lawrence Padilla
ATTORNEY United States Patent Office 3,536,817
Patented Oct. 27, 1970

3,536,817
ELECTRIC FURNACE REGULATION SYSTEM
John H. Carroll, deceased, late of Ashtabula, Ohio, by Barbara Carroll, commissioner, Ashtabula, Ohio, and John A. Persson, Tonawanda, N.Y., assignors to Union Carbide Corporation, a corporation of New York
Filed May 22, 1968, Ser. No. 731,339
Int. Cl. H05b 7/18
U.S. Cl. 13—12                 4 Claims

ABSTRACT OF THE DISCLOSURE

An electric smelting furnace system having a multi-phase electrical power transformer and a plurality of electrodes, and including a multi-phase regulating means connected to the primary winding of the power transformer is provided. In the preferred embodiment, the regulating means consists of an autotransformer and the tap changers on the autotransformer are adjusted independently of each other, thus enabling the voltage of each electrode to be individually controlled. Means for adjusting the output potential in response to current variations in each phase also form a part of the furnace system.

FIELD OF INVENTION

The invention relates to electric smelting furnaces and more specifically to a means for controlling the voltage to each electrode in a multi-phase smelting furnace.

DESCRIPTION OF PRIOR ART

Methods and devices designed to control the unstable operation of electrodes in electric smelting furnaces are constantly being investigated and developed. Because the charge in the furnace normally forms a part of the electrical circuit, a perfect balance in the operation of the electrodes in a multi-phase circuit is impossible since each electrode will penetrate into the charge at a different rate and will be consumed during its operation at a different rate. The instability in electrode operation causes an imbalance in the multi-phase power which is supplied to the system resulting in inefficient power consumption and unfavorable metallurgical operating conditions.

One of the earliest methods devised to correct the imbalance consists of manual regulation of the position of each electrode with respect to the charge in the furnace. The electrodes are raised or lowered in response to variations in the metered current or in the phase impedance. Subsequent refinements in the manner of operation have resulted in automatic devices to control the electrode height. While this method has been operative for many years, it is not without disadvantages. For example, excessive movement of the electrodes causes electrode breakage with the attendant concentration of carbon in localized regions of the furnace. This undesirable metallurgical condition must be corrected and thus electrode breakage is often followed by a period of low power operation or even furnace shutdown.

Variations in electrical operation of the electrodes have also been corrected by carrying the reactance in each phase of the system. Reactances are added in substantially the same manner as electrode height is controlled, that is, by mechanisms responsive to current fluctuations. Recent systems include a digital computer to automatically program the exact amount of reactance to be added or removed from each phase. The reactance is added to the input of the power circuit to balance the power input to all phases and to operate the electrodes at maximum arc power input point. As can be readily appreciated, this type of control, although somewhat effective, can require expensive auxiliary equipment. In addition, the reactance components are generally cumbersome to operate with and precise regulation is usually impractical to achieve. Furthermore, the object of such a system is to balance total input power and so all three phases are affected whenever a single phase is to be corrected.

DESCRIPTION OF THE INVENTION

The electrical circuit of a multi-phase electric arc furnace includes a power transformation system which is connected at the secondary terminals to the electrodes and at the primary terminals to the incoming power supply lines. It has been discovered that excellent voltage control at the electrodes can be achieved by employing a voltage regulating system between the incoming power supply lines and the primary terminals of the power transformer. The system is provided with an adjustable control for each phase thereby providing individual adjustment means for each phase of the multi-phase system. As a result, the voltage at each electrode is separately varied in response to the fluctuations of the current in that segment of the circuit. In this way, proper electrical current balance in the primary circuit is achieved without the need for changing the physical height of the electrodes. Furthermore, each electrode can be operated at the maximum power input without being adversely affected by the conditions of operation in the other electrodes.

More specifically, a multi-phase autotransformer consisting of windings connected, as for example in a three phase system, in either a Y or delta configuration, can be connected across the three-phase power supply lines. In this case, each winding is provided with a plurality of tap positions and a movable tap changer. The tap changers are electrically connected to the terminals of a power transformer which is preferably in a delta or Y array. The tap changers are adjusted individually by a driving force such as a motor to effect an increase or decrease in potential supplied to each phase as the system functions. The voltage at the secondary terminals and thus at the electrodes varies directly with the position of the tap changer on the autotransformer in accordance with the well known principles of transformer operation.

DESCRIPTION OF THE DRAWINGS

The invention will be more readily understood by referring to the accompanying drawings wherein:

FIG. 1 is a schematic illustration of an electric furnace embodying the principles of this invention;

FIGS. 2, 3 and 4 are circuit diagrams of three transformer connections which can be employed in the furnace of FIG. 1;

FIG. 5 is a circuit schematic diagram of one means for controlling the position of the tap changer on the autotransformers shown in FIGS. 2, 3 and 4.

In FIG. 1 an electric arc furnace is depicted as including electrodes 10, 12 and 14 positioned in the charge 16 which is contained in the furnace housing means 18. The electrodes are electrically connected to the output terminals 20, 22, 24 of the power transformer 26. The input terminals 27, 29, 31 of the power transformer 26 are electrically connected to the autotransformer tap changers designated by the numerals 34, 36 and 38 respectively. The input terminals of the autotransformer are electrically connected directly to a three-phase power supply (not shown) and control devices 28, 30 and 32 which are also mechanically linked to the tap changers as indicated by the dashed lines are shunted across the input power lines.

In the operation of the system, three-phase power is fed from the power supply to the input terminals of the autotransformer 40. The output voltage of each phase of the autotransformer appears at the tap changers 34, 36, and 38 respectively. The output voltage at each of the tap changers is passed to the input terminals 27, 29, 31 of the power transformer 26, transmitted to the output terminals 20, 22, 24 of the same transformer, and is directly connected to the electrodes 10, 12 and 14 respectively. Current is transmitted from each electrode to the charge 16 (which forms a part of the circuit as indicated by the ground symbol on the housing means 18). As the current conditions in any of the electrodes vary due to the electrode being consumed, the charge receding, or because the impedance of the charge varies owing to the many possible causes normally experienced, the current in the power transformer 26 will change in relation to the changes in current at the electrode. Consequently, the current in the primary circuit will change and this change in current will actuate the control device which is in the electrode circuit being affected. As a result, the tap changer on the autotransformer in that circuit will be mechanically changed to a new position at which position the voltage which is fed back to the electrode is altered so as to correct the variation in current appearing in the primary portion of the current. In this manner, an excellent current balance is maintained at all times during the operation of the circuit in each of the three phases, while the electrode currents vary to suit the conditions existing in the furnace. Thus, it is not necessary to move the electrodes to follow these changes.

FIGS. 2, 3 and 4 illustrate various power transformer and autotransformer configurations which can be successfully employed in the apparatus of the invention. In FIG. 2, for example, the power transformer 26 has its secondary 48 connected in a triangular or delta array; the primary 50 of the power transformer is likewise connected in this well known configuration. The autotransformer 40 is however, connected in a Y configuration with the common junction point at node 52. The use of a Y connected autotransformer has provided excellent furnace operating conditions and this therefore represents the preferable circuit arrangement. FIG. 3 shows the power transformer in the same delta connection at secondary and primary windings 48 and 50 respectively; however, the autotransformer 40 is illustrated as being connected in a delta array. FIG. 4 differs from the previous configurations in FIGS. 2 and 3 in that the autotransformer 40 is Y connected and the power furnace transformer 26 has its primary 50 in a Y configuration and its secondary 48 in a delta configuration. Thus, FIG. 4 illustrates a Y to Y to delta arrangement.

The operation of all three circuits shown in FIGS. 2, 3 and 4 is similar, the difference in specific current flow being a function of the individual configuration in each circuit. Currents at the terminals 20, 22 and 24 of the secondary 48 are identical to the currents in the electrodes to which the terminals are connected. In FIG. 2 these currents, in accordance with the known transformer principles, are directly proportional to the currents in the primary windings 34, 36, and 38 and the current in the autotransformer 40. Of course, the current in each phase of the three-phase winding will depend upon the conditions of the secondary circuit of that phase as hereinbefore explained. Thus, changes in electrode current will be reflected directly into the autotransformer circuit and enable the control devices to operate the tap changers 34, 36 and 38 so as to readjust the current balance.

FIG. 5 illustrates one embodiment of a control device which can be successfully employed in the electrical system of the invention. The control device 28 includes a power supply 54, a double-pole double-throw relay 56 with its activating coil 58, and two single-pole single-throw relays 60 and 62 which are activated by the output voltage of bistable amplifiers 64 and 66. A motor 68 is electrically connected to poles 55 and 57 on relay 56; pole 55 is electrically tied to pole 59 and pole 57 to pole 61 on relay 56. A gear drive train 70 is mechanically linked to the motor 68 and to the tap changer 34. Power supply 54 is connected at its positive terminal to relays 60 and 62 as shown and each of these relays is tied to pole 51 on relay 56; the negative terminal of the power supply 54 is directly connected to pole 53 on relay 56. A full wave rectifier 72 is connected across one winding of the autotransformer 40 and converts the alternating current to direct current which is shunted to the bistable amplifiers.

In operation, the power supply 54 is connected to the motor 68 through the relay 60 which is in a normally closed position and the relay 56 which is generally in position at poles 55 and 57. The polarity of the power supply is such as to turn the motor in a clockwise direction causing the tap changer 34 to be rotated downward along the winding of the autotransformer 40. When the current in the primary winding exceeds a certain minimum level, bistable amplifier 64 is activated and causes an output voltage to be fed to a relay coil (not shown) which opens the contact arm on relay 60; thus, the power supply is no longer connected to the motor since the positive side is not directly connected to the pole 51 on the relay 56. As a result, the motor stops and the tap changer is no longer rotated, i.e., it is now in a current balancing position. If the current in the primary circuit continues to increase above a predetermined level, then amplifier 66 is turned on sending an output voltage to the coil (now shown) of relay 62 to close the normally open contact thereby again connecting the power supply to the relay 56. However, the same increase in current which caused amplifier 66 to be activated causes relay coil 58 to be energized, thus drawing the contact arm on relay 56 to poles 59 and 61. This reverses the polarity to the motor 68 and causes the motor to rotate in a counter-clockwise direction causing the tap changer 34 to move upward along the winding on the autotransformer 40. The current is then readjusted by the movement of the tap changer as hereinbefore explained to a level at which amplifier 66 is no longer energized. Relay 62 is then in an open position and the power supply 54 is again not connected to the motor. If the current in the primary winding should fall to a level which is too low then relay 60 would once again be energized to a closed position through amplifier 64 and the cycle would be repeated. In this manner, the motor 68 is activated to rotate in a clockwise or counter-clockwise direction or not activated at all depending upon the current in the system. Of course, the amplifiers can be set to function at various current levels depending upon the demands of the system. A typical bistable amplifier successfully employed in the invention is Type 100 C008 manufactured by the Norbatrol Corporation.

The following example is illustrative of the arc furnace system of the invention.

EXAMPLE

Three single-phase 20 mva. on-load tap changing transformers are connected in the various configurations shown in FIGS. 2, 3 and 4 that is, Y-delta or delta-delta arrays. Each transformation system includes a Y connected autotransformer and a 26 step on tap changer. The output of each fixed ratio transformer can be varied while energized from 122 volts to 231 volts if connected in a Y-delta configuration or from 210 volts to 400 volts in the delta-delta configuration. The current at a normal operating condition in the primary of the autotransformer, that is, at the incoming power lines is 2374 amps. While the current in the primary of each power transformer is approximately 1.5 kiloamperes, the current in the electrodes during operation is about 120 kiloamperes. A motor operated control device similar to that shown in FIG. 4 actuates the tap changer on the autotransformer over the 26 step positions.

The above described system was employed in the smelting of ferrosilicon and during a continuous trial period of two weeks the electrode holders were not moved in the vertical plane. Slipping of the electrode to compensate for electrode consumption was accomplished by feeding the electrode through the holder.

It will be appreciated that a wide variety of modifications may be made in the system of the invention. For example, the control devices 28, 30, and 32 can be specified to perform their function without the automatic control, a manually operated switch system being substituted instead. With this system, the electrical variables can continuously be monitored and the tap settings can be automatically and remotely adjusted. In addition, the autotransformer can itself be designed to have an infinite sensitivity instead of having a series of specific voltage steps. For additional control, reactances may be added in each phase in accordance with the well known principles that have heretofore been employed in the art. Although electrode movement in a vertical plane has been virtually eliminated in this invention, means for such movement could be maintained to provide for non-operational requirements such as maintenance and repair.

While the system of the invention has been described in terms of the preferred embodiment, that is, employing an autotransformer and associated regulating means, other current balancing devices such as control and feedback amplifiers, error detection systems and the like can be used to separately regulate the current in each phase of the multi-phase system. Adaptation of these systems to the principles of this invention are well within the skills of those versed in the art.

What is claimed is:

1. A regulating system for an electric smelting furnace having a plurality of electrodes connected to receive power from a multi-phase power supply through a common multi-phase power transformer comprising: a multi-phase auto transformer electrically coupled between said power supply and said power transformer such that the output of each phase of said auto transformer represents the input to each phase of said power transformer, selectively variable tap changers for varying the output voltage of each phase of the auto transformer and means responsive to the magnitude of current flow in each phase of said auto transformer for varying the position of the tap changers whereby the voltage supplied by each phase of the auto transformer is independently regulated thereby balancing the power supplied to said power transformer.

2. A regulating system having an electric smelting furnace as defined in claim 1 wherein said multi-phase auto transformer is a three phase auto transformer arranged in a Y configuration.

3. A regulating system as defined in claim 2 wherein said power transformer is a three phase transformer, having a primary and secondary being connected in a delta configuration.

4. A regulating system as defined in claim 3 wherein said means for varying the position of each tap changer consists of three control devices, each control device comprising in combination:
    (a) a power supply;
    (b) switching means electrically connected to said power supply;
    (c) an actuator electrically connected to said switching means;
    (d) driving means affixed to said actuator and said tap changer; and
    (e) means for energizing said switching means thereby connecting the power supply to said actuator in response to a variation of current in the winding of said auto transformer associated with said tap changer whereby the driving means moves said tap changer on said auto transformer.

References Cited

UNITED STATES PATENTS

| 2,976,453 | 3/1961 | Lunig | 13—13 X |
| 3,043,894 | 7/1962 | Ravenscroft | 13—13 X |
| 3,204,176 | 8/1965 | Wilson | 323—43.5 |
| 3,312,891 | 4/1967 | McCabe et al. | 323—43.5 |
| 3,427,530 | 2/1969 | Oakes et al. | 323—43.5 |

BERNARD A. GILHEANY, Primary Examiner

R. N. ENVALL, JR., Assistant Examiner

U.S. Cl X.R.

323—43.5, 45